United States Patent
Casati et al.

(10) Patent No.: US 8,417,247 B2
(45) Date of Patent: *Apr. 9, 2013

(54) METHOD OF ASSIGNING A MOBILE UNIT TO A TRACKING AREA BASED ON A LOCATION UPDATE FREQUENCY

(75) Inventors: Alessio Casati, Swindon (GB); Sudeep Palat, Swindon (GB); Said Tatesh, Swindon (GB)

(73) Assignee: Alcatel Lucent, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/271,781

(22) Filed: Oct. 12, 2011

(65) Prior Publication Data
US 2012/0028647 A1   Feb. 2, 2012

Related U.S. Application Data

(63) Continuation of application No. 11/390,995, filed on Mar. 28, 2006, now Pat. No. 8,068,846.

(51) Int. Cl.
*H04W 36/00* (2009.01)

(52) U.S. Cl. ........ 455/440; 455/437; 455/443; 455/447; 455/552.1; 455/456.1; 455/456.2; 370/331

(58) Field of Classification Search ............... 455/456.1, 455/456.2, 456.3, 433, 434, 435.1, 435.2, 455/435.3, 440, 442, 443, 444, 456.4, 456.5, 455/456.6, 457; 370/331, 332
See application file for complete search history.

(56) References Cited

U.S. PATENT DOCUMENTS

| | | | | |
|---|---|---|---|---|
| 5,832,381 A * | 11/1998 | Kauppi | ...................... | 455/432.1 |
| 6,112,097 A * | 8/2000 | Subhankar | ...................... | 455/462 |
| 6,275,706 B1 * | 8/2001 | Rune | .......................... | 455/456.1 |
| 6,487,413 B1 * | 11/2002 | Suojasto | ....................... | 455/446 |
| 6,826,598 B1 * | 11/2004 | Titmuss et al. | ............... | 709/212 |
| 7,020,464 B2 * | 3/2006 | Bahl et al. | ................... | 455/432.1 |
| 2002/0061745 A1* | 5/2002 | Ahn et al. | ...................... | 455/432 |
| 2004/0179492 A1* | 9/2004 | Zhang et al. | ................... | 370/331 |
| 2005/0054349 A1 | 3/2005 | Balachandran et al. | ... | 455/456.1 |
| 2005/0186961 A1* | 8/2005 | Aikawa et al. | ............. | 455/435.1 |
| 2006/0240819 A1* | 10/2006 | Xu et al. | .................... | 455/432.1 |
| 2007/0015518 A1* | 1/2007 | Winter et al. | .............. | 455/456.1 |
| 2007/0247366 A1* | 10/2007 | Smith et al. | .................. | 342/464 |

FOREIGN PATENT DOCUMENTS

| | | |
|---|---|---|
| EP | 1079656 A1 | 8/1999 |
| EP | 1286561 A1 | 8/2002 |

OTHER PUBLICATIONS

PCT/US2007/006505 International Search Report (Mar. 14, 2007).

\* cited by examiner

*Primary Examiner* — Anthony Addy
*Assistant Examiner* — Amanuel Lebassi
(74) *Attorney, Agent, or Firm* — Williams, Morgan & Amerson, P.C.

(57) ABSTRACT

The present invention provides a method for assigning a mobile unit to a tracking area based upon a location update frequency. The method includes selecting one of a technology-specific tracking area and a shared tracking area based on a location update frequency associated with a mobile unit.

24 Claims, 3 Drawing Sheets

METHOD OF ASSIGNING A MOBILE UNIT TO A TRACKING AREA BASED ON A LOCATION UPDATE FREQUENCY

This is a continuation of U.S. application Ser. No. 11/390,995 ("the '995 application"), entitled "Method of Assigning a Mobile Unit to a Tracking Area based on a Location Update Frequency", filed Mar. 28, 2006, now U.S. Pat. No. 8,068,846 in the name of the inventors Alessio Casati, Sudeep Palat and Said Tatesh, which was published Oct. 4, 2007. The earlier effective filing date of the '995 application is hereby claimed for all common subject matter. The '995 application is also hereby incorporated by reference in their entirety for all purposes as if expressly set forth verbatim herein.

BACKGROUND OF THE INVENTION

1. Field of the Invention

This invention relates generally to communication systems, and, more particularly, to wireless communication systems.

2. Description of the Related Art

The coverage area of a wireless communication system is typically divided into a number of cells, which may be grouped into one or more networks. Mobile units located in each cell may access the wireless communications system by establishing a wireless communication link, often referred to as an air interface, with a base station associated with the cell. The mobile units may include devices such as mobile telephones, personal data assistants, smart phones, Global Positioning System devices, wireless network interface cards, desktop or laptop computers, and the like. As a mobile unit moves between cells in the wireless communication system, the mobile unit may periodically provide location update messages that inform the wireless communication system of the mobile unit's current location. The wireless communication system may use the information in the location update messages to locate the mobile unit (e.g., by paging the mobile unit) and then direct information to the mobile unit via a base station indicated when the mobile unit responds to the page.

In some activity states, such as the idle or dormant mode, the mobile unit may not send location update messages even though it may continue to move through the cells in the wireless communication system, until some condition is met (e.g., when the mobile unit crosses the boundary of the tracking area associated with the last location update message, a new location update with the new tracking area is sent). Accordingly, the wireless communication system may not know the exact cell that includes the mobile unit when information becomes available for delivery to the mobile unit. The wireless communication system may attempt to reach the mobile unit by sending paging messages over a plurality of cells belonging to a paging area determined by the network based on the information it has about the last known mobile unit location. For example, the wireless communication system may attempt to reach the mobile unit by sending paging messages to the cells belonging to the last known tracking area.

The paging messages contain information that indicates to the mobile unit that information is available for transmission to the mobile unit. If the mobile unit receives the paging message, it may provide a paging response via a base station that provides wireless connectivity to the cell that includes the base station. The paging response typically indicates that the mobile unit is available to receive the information and also provides information indicating how to route the information to the mobile unit.

Both the paging messages and the location update messages represent system overhead. Accordingly, the wireless communication system is generally designed to meet two conflicting objectives: reducing the overhead from the paging load and reducing the number of location update messages transmitted by the mobile unit. The paging load is typically minimized when the location of the mobile unit is known with relatively high granularity so that each paging message can be transmitted to a relatively smaller number of cells. However, increasing the granularity of the location of the mobile unit requires transmitting a larger number of location update messages. In contrast, reducing the number of location update messages transmitted by the mobile unit may reduce the granularity of the location information used by the wireless communication system to locate the mobile unit, which typically results in each paging message being transmitted to a relatively large number of cells.

The conventional solution to this problem is to define tracking areas that include the cells serviced by a plurality of base stations. The mobile units may then transmit location update messages when they cross from one tracking area to another tracking area and the wireless communication system may begin the paging process by providing paging messages via the base stations in the tracking area indicated by the most recently received location update message. For example, the geographic area served by the wireless communication system may be divided up into multiple tracking areas that encompass the cells serviced by groups of 10 base stations. Mobile units in the wireless communication system may then provide location updates when they cross a cell boundary between the groups of 10 base stations and the wireless communication system may provide paging messages via the groups of 10 base stations in the tracking areas.

Conventional tracking areas may be static, i.e., the association of tracking areas to base stations remains constant over time, or dynamic, i.e., the wireless communication system may modify the tracking areas associated with a mobile unit. For example, an entity, such as a radio network controller, in a wireless communication system that implements dynamic modification of the tracking areas may determine a distance that the mobile unit has traveled between successive location update messages. If the mobile unit has moved a relatively large distance, the radio network controller may increase the size of the tracking area associated with the mobile unit to include a larger number of base stations. Conversely, if the mobile unit has moved a relatively small distance, the radio network controller may decrease the size of the tracking area. Conventional wireless communication systems may also dynamically adjust the size of tracking areas based on a velocity of the mobile unit.

Implementing static tracking areas and accounting for movement of the mobile units through these tracking areas using entities in the wireless communication system, e.g., in a radio network controller, increases the computational load in the wireless communication system. The computational load may be further increased if the tracking areas are dynamically assigned by the wireless communication system, at least in part because the algorithms for assigning and/or modifying tracking areas associated with each mobile unit are computationally much more complex than the algorithms used to implement static tracking areas. For example, each radio network controller may need to acquire, store, and manipulate information indicating at least the current and previous locations of each mobile unit served by the radio network controller, as well as the size and/or constituent base stations of the tracking areas associated with each mobile unit served by the radio network controller.

Mobile units may also be able to support multiple modes that permit the mobile units to access different wireless communication technologies. For example, a first technology may be used to provide wireless connectivity over a first area and a second technology (e.g., a new or updated technology) may be used to provide wireless connectivity over a second area that overlaps with a portion of the first area. Thus, when the mobile unit moves it may encounter areas where the environmental and/or radio conditions cause the mobile unit to move between the different technologies, which may cause the mobile unit to transmit location update messages. The proliferation of different wireless communication technologies, as well as the increasing market demand for access to these technologies, is expected to result in an increase in the number of multimode mobile units that can access multiple technologies. Consumers will also expect the multimode mobile units to move seamlessly across multiple technologies.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for assigning a mobile unit to a tracking area based upon a location update frequency. The method includes selecting one of a technology-specific tracking area and a shared tracking area based on a location update frequency associated with a mobile unit.

BRIEF DESCRIPTION OF THE DRAWINGS

The invention may be understood by reference to the following description taken in conjunction with the accompanying drawings, in which like reference numerals identify like elements, and in which.

Figure 1:
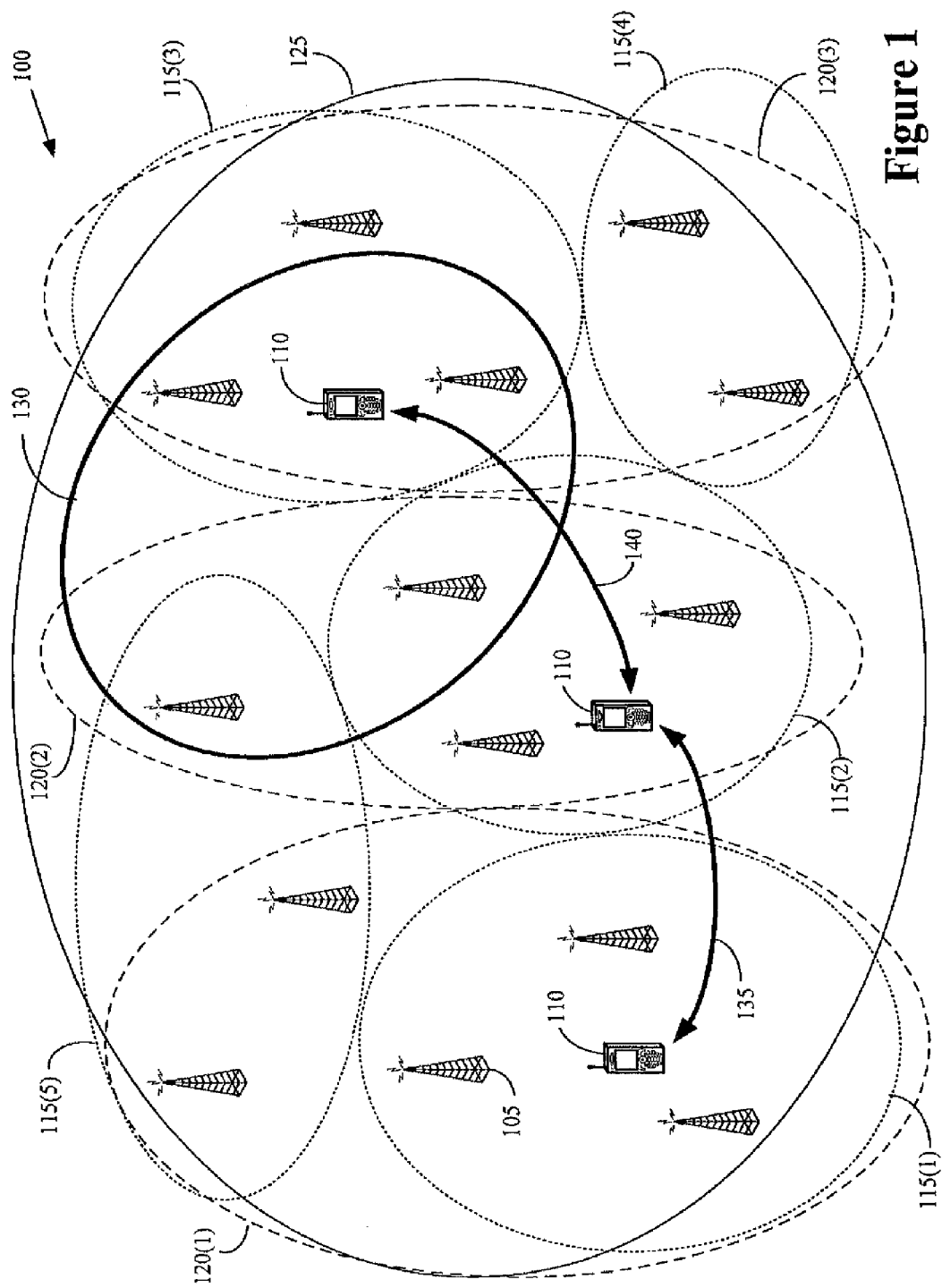
FIG. 1 conceptually illustrates a first exemplary embodiment of a wireless communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates a first exemplary embodiment of a wireless communication system 100. In the illustrated embodiment, a plurality of base stations 105 (only one indicated in FIG. 1) provide wireless connectivity to a corresponding plurality of geographic areas or cells (not shown). Although base stations 105 are used to provide wireless connectivity in the first exemplary embodiment of the wireless communication system 100, persons of ordinary skill in the art having benefit of the present disclosure should appreciate that the present invention is not limited to base stations 105. In alternative embodiments, base station routers, access networks, access points, and the like may also be used to provide wireless connectivity.

The base stations 105 may provide wireless connectivity to one or more mobile units 110. In the interest of clarity, a single mobile unit 110 is depicted in FIG. 1. However, persons of ordinary skill in the art having benefit of the present disclosure should appreciate that any number of mobile units 110 may be deployed in the geographic areas served by the wireless communication system 100. Exemplary mobile units may include, but are not limited to, cellular telephones, personal data assistants, smart phones, pagers, text messaging devices, network interface cards, notebook computers, desktop computers, and the like. As used herein, the terms "wireless communication system" and/or "wireless communication network" will be understood to refer to the base stations 105 and any other entities or devices that may be used to provide wireless connectivity to the mobile units 110. However, the mobile units 110 will be understood to be distinct and separate from the wireless communication system 100.

The base stations 105 (or other entities used to provide wireless connectivity) may implement one or more of a plurality of technologies. As used herein, the term "technology" will be understood to refer to a set of standards and/or protocols that, when implemented in the wireless communication system 100 and the mobile units 110, enable a wireless communication system 100 and the mobile units 110 to communicate. The Universal Mobile Telecommunication System (UMTS) and the Global System for Mobile communication (GSM) are examples of wireless communication technologies. Different releases of sets of standards and/or protocols may also constitute different technologies. However, individual standards or protocols that are defined by systems such as UMTS or GSM may or may not constitute separate technologies, depending on whether or not the individual standards or protocols may independently enable communication between a wireless communication system 100 and the mobile units 110. Exemplary wireless communication technologies may include, but are not limited to, Code Division Multiple Access (CDMA, CDMA 2000), Frequency Division Multiple Access (FDMA), Orthogonal Frequency Division Multiple Access (OFDMA), systems defined according to one or more of the IEEE 802 standards, and the like.

In the illustrated embodiment, the mobile units 110 are multiple mode mobile units 110 that are capable of accessing the wireless communication system 100 via a plurality of technologies. For example, the mobile units 110 may be dual-mode mobile units 110 other capable of accessing the wireless communication system 100 using either UMTS or GSM. However, persons of ordinary skill in the art having benefit of the present disclosure should appreciate that the present invention is not limited to dual-mode mobile units 110 that implement UMTS and GSM. In alternative embodiments, the mobile units 110 may be capable of operating in any number of modes to access the wireless communication system 100 using any number of wireless communication technologies. Furthermore, the wireless communication technologies implemented by the mobile units 110 are matters of design choice and not material to the present invention.

The base stations 105 are grouped into tracking areas 115 (1-5), 120(1-3), 125, 130 that include the geographic areas served by the constituent base stations 105. The indices (1-5) and (1-3) may be dropped when referring to the tracking areas 115, 120, collectively. However, these indices may be used to indicate individual tracking areas 115, 120 or subsets thereof. This convention may also be applied to other groups of elements indicated by a single number and an associated plurality of indices. In the illustrated embodiment, the tracking areas 115, 120, 125 are associated with a particular wireless communication technology. For example, base stations 105 in the tracking areas 115, 120, 125 may implement UMTS. The tracking area 130 is associated with a different wireless communication technology. For example, base stations 105 in the tracking area 130 may implement GSM. Accordingly, the tracking areas 115, 120, 125, 130 may be referred to as technology-specific tracking areas 115, 120, 125, 130.

The technology-specific tracking areas 115, 120, 125 are organized in a hierarchical fashion such that the tracking areas 115 include a relatively small number of base stations 105, the tracking areas 120 include a relatively larger number of base stations 105 than the tracking areas 115, and the tracking areas 125 include a relatively larger number of base stations 105 than the tracking areas 120. In some embodiments, the tracking areas 115, 120, 125 may provide wireless connectivity to progressively larger geographical areas via the progressively larger numbers of base stations 105. However, this may not always be the case, at least in part because the geographical areas served by different base stations 105 may vary based on numerous factors known to persons of ordinary skill in the art.

The mobile unit 110 selects or is assigned to one of the tracking areas 115, 120, 125, 130. Information indicating the identities of the tracking areas 115, 120, 125, 130 associated with the cell (or cells) that are providing wireless connectivity to the mobile unit 110 may be provided to the mobile unit 110, e.g., by broadcasting a message that contains this information. In the illustrated embodiment, the mobile unit is initially assigned to the tracking area 115(1), which is associated with the first technology. Accordingly, if information destined for the mobile unit 110 becomes available, the wireless communication system 100, or an entity therein such as a radio network controller (not shown), may attempt to locate the mobile unit 110 by providing one or more paging messages via the base stations 105 located within the tracking area 115(1). As used herein, the term "paging message" will be understood to refer to any message transmitted to the mobile unit 110 to indicate that the wireless communication system 100 would like to establish communications with the mobile unit 110.

The mobile unit 110 may roam from the initial tracking area 115(1) into other tracking areas such as the tracking area 115(2), which is also associated with the first technology, as indicated by the arrow 135. In one embodiment, the mobile unit 110 may be configured to provide a location update message when the mobile unit 110 crosses a boundary between the initial tracking area 115(1) and the tracking area 115(2). Some wireless communication protocols define a particular Location Update message having a particular format and including certain predetermined types of information.

However, as used herein, the term "location update message" will be understood to refer to any message transmitted by the mobile unit 110 that contains information that may be used, e.g., by the wireless communication system 100, to determine a location of the mobile unit 110. For example, the wireless communication system 100 may use the location update message to determine that the mobile unit 110 is in the tracking area 115(2).

The mobile unit 110 or an entity/node (not shown in FIG. 1) in the wireless communication system 100 may determine a location update frequency associated with the mobile unit 110 as it roams through the wireless communication system 100. In one embodiment, a timer (not shown) may be used to count down (or count up) for a predetermined time period. The number of location update messages transmitted while the timer is counting down (or counting up) may be counted. The location update frequency may then be determined by dividing the total number of location update messages by the predetermined time period. For example, if the predetermined time period is approximately 1 minute and 10 location update messages are transmitted during that time, then the location update frequency is approximately 10 per minute. In one embodiment, separate timers and/or location update frequencies may be associated with each of the tracking areas 115, 120, 125, 130.

A tracking area 115, 120, 125 may then be selected or determined based on the location update frequency associated with the mobile unit 110. In one embodiment, the mobile unit 110 may be assigned to one of the small tracking areas 115. However, the location update frequency may be above a selected threshold level and the mobile unit 110 therefore be assigned to one of the relatively larger tracking areas 120. If the location update frequency subsequently falls below another selected threshold level, the mobile unit 110 may be reassigned to a smaller tracking area 115. However, if the location update frequency remains high (or increases) the mobile unit 110 may be reassigned to a yet larger tracking area 125.

The mobile unit 110 may roam from the tracking area 115(2) associated with the first technology into tracking areas associated with a different technology, such as the tracking area 130, which is associated with a second technology such as GSM, as indicated by the arrow 140. In one embodiment, the mobile unit 110 may be configured to provide a location update message when the mobile unit 110 crosses a boundary between the tracking area 115(2) associated with the first technology and the tracking area 130 associated with the second technology. In the illustrated embodiment, the tracking area 130 associated with the second technology overlaps portions of various tracking areas 115, 120, 125 associated with the first technology. Thus, the mobile unit 110 may be able to access the wireless communication system 100 via either the first or the second technology.

Movement of the mobile unit 110, changing environmental conditions, variations in radio transmission characteristics, coverage holes, and other factors may result in the mobile unit 110 switching between the first and second technologies and/or the tracking areas 115, 120, 125, 130. The mobile unit 110 may transmit a relatively large number of location update messages in response to the transitions between the tracking areas 115, 120, 125 associated with the first technology and the tracking area 130 associated with the second technology. The mobile unit 110 may therefore be assigned to a shared tracking area (not shown in FIG. 1) that encompasses portions of the technology-specific tracking areas 115, 120, 125, 130. As used herein, the term "shared tracking area" will be understood to refer to a tracking area that encompasses geographical areas served by base stations 105 that provide wireless connectivity within portions of the shared tracking area according to at least two different technologies.

Figure 2:
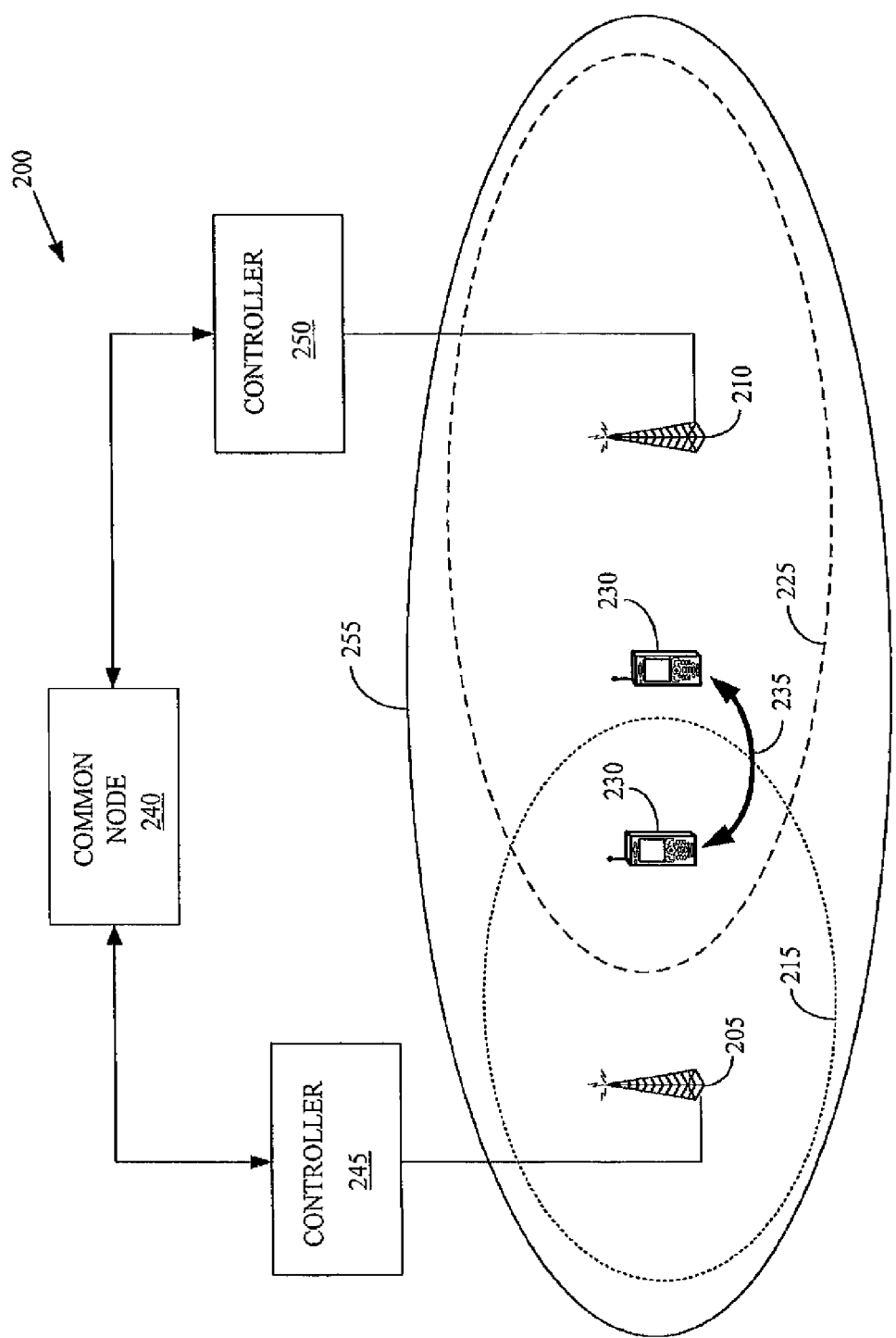
FIG. 2 conceptually illustrates a second exemplary embodiment of a wireless communication system, in accordance with the present invention.

FIG. 2 conceptually illustrates a second exemplary embodiment of a wireless communication system 200. In the illustrated embodiment, the wireless communication system 200 includes base stations 205, 210 that provide wireless connectivity to corresponding geographic areas 215, 225 according to first and second technologies, respectively. The geographic areas 215, 225 shown in FIG. 2 correspond to technology-specific tracking areas associated with the first and second technologies. However, persons of ordinary skill in the art having benefit of the present disclosure should appreciate that the geographic areas 215, 225 may not necessarily correspond exactly to a tracking area. For example, the technology-specific tracking areas associated with the first and second technologies may encompass a larger area and/or more base stations than shown in FIG. 2.

A mobile unit 230 is initially located in an overlapping region associated, with both of the technology-specific tracking areas 215, 225. The mobile unit 230 is a multiple mode device that may access the wireless communication system 200 using either the first or the second technology when located in the overlapping region. As discussed above, changing environmental conditions, channel qualities, coverage holes, and the like may result in the mobile units 230 switching between the first and second technologies. Variations in these conditions may also result in the boundaries of the technology-specific tracking areas 215, 225 sweeping back and forth across the location of the mobile unit 230. Furthermore, the mobile unit 230 may move from the overlapping region into a region associated exclusively with the technology-specific tracking area 225, as indicated by the arrow 235. These events, and other like events, may trigger transmission of a location update message by the mobile unit 230.

A location update frequency associated with transitions between the technology-specific tracking areas 215, 225 may be determined. In one embodiment, the mobile unit 230 determines the location update frequency associated with the transitions between the technology-specific tracking areas 215, 225. For example, the mobile unit 230 may initiate a timer in response to transmitting a location update message triggered by a transition between the technology-specific tracking areas 215, 225. The timer may have a predetermined duration and the mobile unit 230 may count or record the number of location update messages triggered by transitions during the predetermined duration of the timer. The mobile unit may then determine the location update frequency by dividing the number of location update messages by the duration of the timer.

A common node 240 shared by portions of the wireless communication system 200 that implement the first and second wireless communication technologies may also be used to determine the location update frequency associated with transitions between the tracking areas 215, 225. For example, the base station 205 may be coupled to a controller 245 (such as a radio network controller) which may be communicatively coupled to the common node 240. The base station 210 may be coupled to another controller 250 such as a radio network controller, which is also communicatively coupled to the common node 240. The common node 240 may receive signals or information in response to location update messages associated with transitions between the technology-specific tracking areas 215, 225 and may use this information to determine a location update frequency associated with transitions between the technology-specific tracking areas 215, 225. Although the common node 240 has been described herein as a separate entity, persons of ordinary skill in the art having benefit of the present disclosure should appreciate that the common node 240 does not necessarily need to be implemented as a separate entity. For example, the common node 240 may be implemented in one of the base stations 205, 210 using appropriate signaling supported by the interface between the base stations 205, 210.

In the illustrated embodiment, the common node 240 may keep track of the number of transitions the mobile unit 230 makes between the two technology-specific tracking areas 215, 225. The common node 240 may retain a record of the previous registrations of the users for a period of time that is configurable. For example, the common node 240 may implement a timer similar to the timer discussed above. The common node 240 may also keep track of the tracking areas 215, 225 visited by the mobile units 230 to determine whether or not the mobile unit 230 is switching back and forth, or "ping-pong-ing," between the same two tracking areas 215, 225. For example, the new system may contact the old one when the mobile unit 230 moves from one to the other so that the systems may exchange information that may be used to keep track of the tracking areas 215, 225 visited by each mobile unit 230. In one embodiment, the common node 240 may also include functionality for providing paging messages to the mobile unit 230.

The mobile unit 230 may be assigned to a shared tracking area 255 based on the location update frequency associated with transitions between the technology-specific tracking areas 215, 225. In embodiments in which the mobile unit 230 determines the location update frequency, the mobile unit 230 may provide a reassignment request message to the wireless communication network 200 indicating that it should be assigned to the shared tracking area 255. For example, the mobile unit 230 may provide the reassignment request message when the number of transitions between two systems exceeds a configurable threshold in a given period of time. The wireless communication network 200 may then assign the mobile unit 230 to the shared tracking area 255 in response to receiving the reassignment request message. In embodiments in which the common node 240 determines the location update frequency, the wireless communication network 200 may assign the mobile unit 230 to the shared tracking area 255 and then provide a message indicating the assignment to the mobile unit 230.

Once assigned to the shared tracking area 255, the mobile unit 230 does not provide any location update messages until it crosses out of the shared tracking area 255. Thus the mobile unit 230 is allowed to move between the cells of the different systems providing wireless connectivity within the shared tracking area 255 without generating a location update as long it does not leave the shared tracking area 255. In embodiments in which the mobile unit 230 determines the location update frequency, the mobile unit 230 may keep track of the number of transitions between technology-specific tracking areas 215, 225 that occur while the mobile unit 230 is assigned to the shared tracking area 255. If the number of transitions exceeds a threshold during a given time period, e.g., as indicated by counter, then the mobile unit 230 may be required to remain in the shared tracking area 255.

To reach the mobile unit 230, e.g., when information destined for the mobile unit 230 is received by the wireless communication system 200, the wireless communication system 200 may page the mobile unit 230 by providing a paging message via some or all of the cells shared tracking area 255. For example, the wireless communication network 200 may transmit paging messages according to the first and second technologies using the base stations 205, 220. In one embodiment, the common node 240 may be notified when the mobile units 230 moves to an idle (or paging) state so that the common node 240 can initiate the paging in all systems of the shared tracking area 255. The mobile unit 230 may be provided with paging identities for the systems associated with the shared tracking area 255 if these systems are different.

The mobile unit 230 may also be reassigned to a technology-specific tracking area 215, 225 after being assigned to the shares traffic area 255. In one embodiment, the mobile unit 230 may be reassigned to one of the technology-specific tracking areas 215, 225 after a selected time if the mobile unit remains within a specific technology without changing to the other technology. For example, a "cooling off" timer may be implemented in either the mobile unit 230 or the common node 240. The cooling-off timer may be used to decide when the mobile unit 230 may be reassigned to the technology-specific tracking area 215, 225, e.g., by starting the timer when the mobile unit 230 is assigned to the shared traffic area 255 and then triggering reassignment to one of the technology-specific tracking areas 215, 225 after the cooling-off timer has counted up (or counted down) to a predetermined time and the mobile unit remains within a specific technology without changing to the other technology. In one embodiment, separate cooling off timers may be associated with different technology-specific tracking areas 215, 225 and the mobile unit 230 may be reassigned to the technology-specific tracking area 215, 225 associated with the cooling-off timer, when the associated cooling-off timer reaches the predetermined duration.

Figure 3:
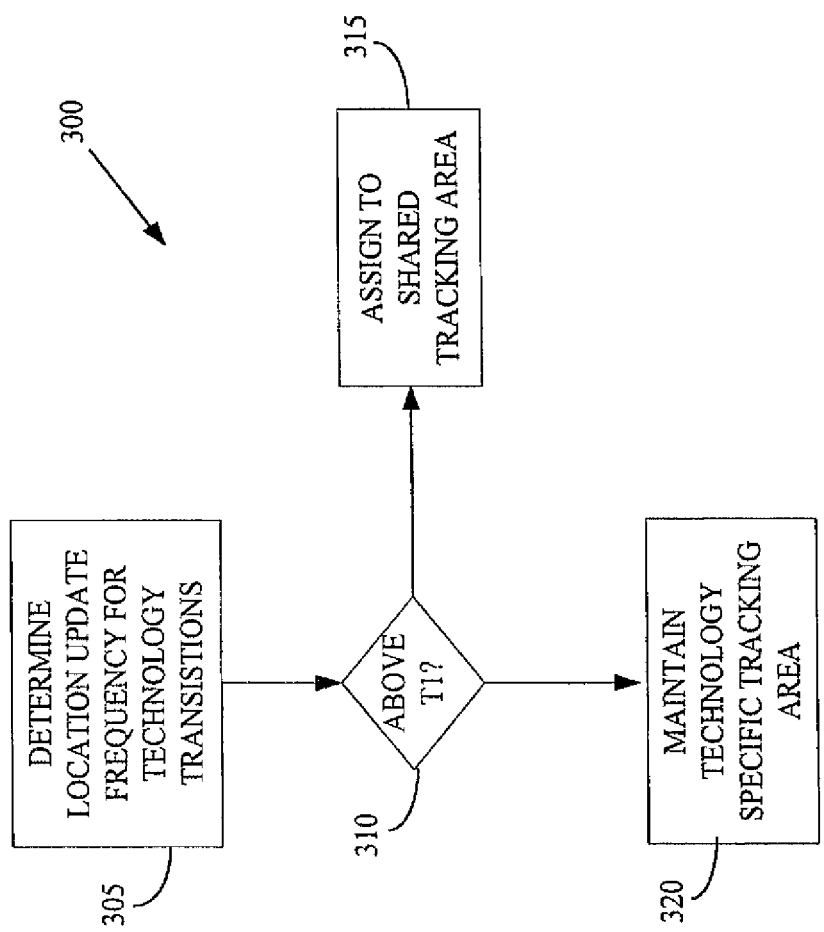
FIG. 3 conceptually illustrates one exemplary embodiment of a method of assigning mobile units to shared tracking areas, in accordance with the present invention.

FIG. 3 conceptually illustrates one exemplary embodiment of a method 300 of assigning mobile units to shared tracking areas. In the illustrated embodiment, a location update frequency associated with transitions between technology-specific tracking areas may be determined (at 305). For example, is a mobile unit or a common node within the network may determine (at 305) the location update frequency associated with the transitions. Whether or not the location update frequency is above a threshold value (T1) may then be determined (at 310). If the location update frequency is above the threshold value, then the mobile unit may be assigned (at 315) to a shared tracking area. For example, the mobile unit may request assignment to a shared tracking area and the wireless communication system may assign (at 315) the mobile unit to the shared tracking area. For another example, the wireless indication system may assign (at 315) the mobile unit to the shared tracking area and may then notify the mobile unit of the assignment. However, if the location update frequency is not above the threshold value, the mobile unit may remain (at 320) in the current technology-specific tracking area.

Embodiments of the techniques described above may have a number of advantages over conventional practice. For example, signaling traffic and missed calls caused by toggling mobile units between different technologies, e.g. when the coverage of one or more of the wireless systems is patchy and/or variable, may be reduced. Additionally, paging overhead across multiple systems may be reduced, particularly for mobile units that are in full coverage areas of one system. The techniques described above may also combine the benefits of shared tracking area approaches and technology-specific tracking area approaches in a single method that does not require complex algorithms to run. The techniques described above may also be implemented in any system regardless of the radio access technology, as long as the system supports the necessary broadcast information. Battery consumption in the mobile units may also be reduced relative to systems that require that the mobile unit maintain dual (or multiple) registers to support the dual (or multiple) systems.

Furthermore, the various thresholds used to select the technology-specific tracking areas and/or the shared tracking areas may be modified as necessary. Thus, operators may flexibly configure systems to reduce or minimize location update and paging load due to intersystem mobility in idle mode. This approach can apply to many potential architectural options, and depending on the one it applies to, the same benefits/drawbacks may apply with the advantage of being able to flexibly page on one or both technologies depending on the coverage patterns and the behavior of the mobile unit (s).

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A mobile unit configured for wireless communication with a wireless communication system including first base stations that operate according to a first technology and are assigned to at least one first technology-specific tracking area and second base stations that operate according to a second technology and are assigned to at least one second technology-specific tracking area, wherein the mobile unit is configured to:
   detect a transition of the mobile unit between said at least one first technology-specific tracking area and said at least one second technology-specific tracking area;
   determine, in response to detecting the transition, a location update frequency indicating a frequency of transitions of the mobile unit between said at least one first technology-specific tracking area and said at least one second technology-specific tracking area; and
   request assignment to a shared tracking area based on the location update frequency, the shared tracking area comprising at least one of the first base stations and at least one of the second base stations.

2. The mobile unit of claim 1, wherein the mobile unit is configured to request assignment to the shared tracking area when the location update frequency exceeds a selected threshold.

3. The mobile unit of claim 2, wherein the mobile unit is configured to determine the location update frequency by initiating a timer in response to detecting the transition between said at least one first technology-specific tracking area and said at least one second technology-specific tracking area.

4. The mobile unit of claim 3, wherein the mobile unit is configured to determine a number of location updates transmitted by the mobile unit in response to transitions between said at least one first technology-specific tracking area and said at least one second echnology-specific tracking area during a time period indicated by the timer.

5. The mobile unit of claim 1, wherein the mobile unit is configured to request assignment to the shared tracking area when the location update frequency exceeds a selected threshold.

6. The mobile unit of claim 1, wherein the mobile unit is configured to select the shared tracking area.

7. The mobile unit of claim 1, wherein the mobile unit is configured to determine a number of transitions between technology-specific tracking areas after the mobile unit has been assigned to the shared tracking area indicated in the request for assignment.

8. The mobile unit of claim 7, wherein the mobile unit is configured to maintain the assignment of the mobile unit to the shared tracking area in response to determining that the number of transitions between technology-specific tracking areas after the mobile unit has been assigned to the shared tracking area exceeds a predetermined threshold.

9. A common node configured to be communicatively coupled to first and second base stations, wherein the first base stations operate according to a first technology and are assigned to at least one first technology-specific tracking area and the second base stations operate according to a second technology and are assigned to at least one second technology-specific tracking area, wherein the common node is configured to:
   detect a transition of the mobile unit between said at least one first technology-specific tracking area and said at least one second technology-specific tracking area;
   determine, in response to detecting the transition, a location update frequency indicating a frequency of transitions of the mobile unit between said at least one first technology-specific tracking area and said at least one second technology-specific tracking area; and
   assign the mobile unit to a shared tracking area based on the location update frequency, the shared tracking area comprising at least one of the first base stations and at least one of the second base stations.

10. The common node of claim 9, wherein the common node is configured to provide information indicative of the assignation of the mobile unit to the shared tracking area to the mobile unit.

11. The common node of claim 9, wherein the common node is configured to assign the mobile unit to the shared tracking area such that paging messages are provided to the mobile unit via said at least one of the first base stations or said at least one of the second base stations included in the shared tracking area.

12. The common node of claim 9, wherein the common node is configured to assign the mobile unit to the technology-specific tracking area based on a timer that is restarted when a technology change happens and continues counting up or down when no technology change happens.

13. The common node of claim 12, wherein the common node is configured to initiate the timer in response to selecting the shared tracking area and assigning the mobile unit to either the first technology-specific tracking area or the second technology-specific tracking area after a predetermined duration indicated by the timer.

14. The common node of claim 9, wherein the common node is configured to determine the location update frequency.

15. The common node of claim 14, wherein the common node is configured to determine the location update frequency using a record of previous registrations of mobile units.

16. The common node of claim 15, wherein the common node is configured to keep track of tracking areas visited by the mobile unit and determine whether the mobile unit is ping-ponging based on the tracking areas visited by the mobile unit.

17. A first base station configured to operate according to a first technology and to be assigned to at least one first technology-specific tracking area, wherein the first base station is configured to be communicatively coupled to at least one second base station that operates according to a second technology and is assigned to at least one second technology-specific tracking area, wherein the first base station is configured to:

- detect a transition of the mobile unit between said at least one first technology-specific tracking area and said at least one second technology-specific tracking area;
- determine, in response to detecting the transition, a location update frequency indicating a frequency of transitions of the mobile unit between said at least one first technology-specific tracking area and said at least one second technology-specific tracking area; and
- assign the mobile unit to a shared tracking area based on the location update frequency, the shared tracking area comprising the first base station and said at least one second base station.

18. The first base station of claim 17, wherein the first base station is configured to provide information indicative of the assignation of the mobile unit to the shared tracking area to the mobile unit.

19. The first base station of claim 17, wherein the first base station is configured to assign the mobile unit to the shared tracking area such that paging messages are provided to the mobile unit via said first base station or said at least one second base station included in the shared tracking area.

20. The first base station of claim 17, wherein the first base station is configured to assign the mobile unit to the technology-specific tracking area based on a timer that is restarted when a technology change happens and continues counting up or down when no technology change happens.

21. The first base station of claim 20, wherein the first base station is configured to initiate the timer in response to selecting the shared tracking area and assigning the mobile unit to either the first technology-specific tracking area or the second technology-specific tracking area after a predetermined duration indicated by the timer.

22. The first base station of claim 17, wherein the first base station is configured to determine the location update frequency.

23. The first base station of claim 22, wherein the first base station is configured to determine the location update frequency using a record of previous registrations of mobile units.

24. The first base station of claim 23, wherein the first base station is configured to keep track of tracking areas visited by the mobile unit and determine whether the mobile unit is ping-ponging based on the tracking areas visited by the mobile unit.

* * * * *

UNITED STATES PATENT AND TRADEMARK OFFICE
CERTIFICATE OF CORRECTION

PATENT NO.        : 8,417,247 B2
APPLICATION NO.   : 13/271781
DATED             : April 9, 2013
INVENTOR(S)       : Alessio Casati, Sudeep Palat and Said Tatesh It is certified that error appears in the above-identified patent and that said Letters Patent is hereby corrected as shown below:

In the Claims

Col. 11, line 58 (claim 4, line 5), delete "echnology-specific" replace with -- technology-specific --.

Signed and Sealed this
Twenty-first Day of May, 2013

Teresa Stanek Rea
*Acting Director of the United States Patent and Trademark Office*